United States Patent
Song et al.

(10) Patent No.: US 9,307,565 B2
(45) Date of Patent: Apr. 5, 2016

(54) SELECTIVE BEARER ESTABLISHMENT IN E-UTRAN/EPS

(71) Applicant: QUALCOMM Incorporated, San Diego, CA (US)

(72) Inventors: Osok Song, San Diego, CA (US); Francesco Grilli, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/330,870

(22) Filed: Jul. 14, 2014

(65) Prior Publication Data

US 2015/0009919 A1 Jan. 8, 2015

Related U.S. Application Data

(63) Continuation of application No. 12/415,252, filed on Mar. 31, 2009, now Pat. No. 8,780,814.

(60) Provisional application No. 61/042,676, filed on Apr. 4, 2008.

(51) Int. Cl.
*H04W 76/00* (2009.01)
*H04W 76/02* (2009.01)
*H04W 36/28* (2009.01)

(52) U.S. Cl.
CPC ............ *H04W 76/025* (2013.01); *H04W 36/28* (2013.01)

(58) Field of Classification Search
None
See application file for complete search history.

(56) References Cited

U.S. PATENT DOCUMENTS

| | | |
|---|---|---|
| 6,415,146 B1 | 7/2002 | Capece |
| 7,400,893 B2 | 7/2008 | Yi et al. |
| 7,558,240 B2 | 7/2009 | Chen et al. |
| 7,656,902 B2 | 2/2010 | Yi et al. |

(Continued)

FOREIGN PATENT DOCUMENTS

| | | |
|---|---|---|
| RU | 2289204 C2 | 12/2006 |
| RU | 2303858 | 7/2007 |

OTHER PUBLICATIONS

3GPP: "3GPP TS 23.402 V8.1.1 (Mar. 2008); Technical Specification Group Services and System Aspects; Architecture enhancements for non-SGPP accesses (Release 8)" [Online] Mar. 25, 2008, p. 1,136-139, XP002540644Retrieved from the Internet: URL:http://www.3gpp.org/ftp/Specs/html-1nfo/23402.htm> [retrieved on Aug. 7, 2009].

(Continued)

*Primary Examiner* — Alex Skripnikov

(57) ABSTRACT

Systems and methodologies are described that facilitate selectively and simultaneously establishing multiple bearers in wireless communication networks. A core network entity in a wireless network can transmit a bearer establishment request to an access point comprising a list of bearers to establish with a related mobile device. The bearer establishment request comprising list of bearers includes separate non-access stratum (NAS) messages corresponding to each bearer in the list. The separate NAS messages can be linked to each bearer entry in the list. The access point can receive the list and attempt to initialize one or more radio bearers in the list. Since the NAS messages individually correspond to a given bearer, the access point can forward NAS messages to the mobile device only for bearers that are successfully initialized allowing selective establishment thereof. In addition, the access point can provide initialization status for the individual bearers to the core network.

24 Claims, 15 Drawing Sheets

(56) References Cited

U.S. PATENT DOCUMENTS

| | | | |
|---|---|---|---|
| 8,780,814 B2 | 7/2014 | Song et al. | |
| 2006/0025073 A1 | 2/2006 | Benco et al. | |
| 2006/0268818 A1 | 11/2006 | Chen et al. | |
| 2007/0123195 A1 | 5/2007 | Lv et al. | |
| 2007/0155422 A1 | 7/2007 | Johansen et al. | |
| 2009/0129342 A1* | 5/2009 | Hwang | H04W 36/0022 370/331 |
| 2009/0149189 A1* | 6/2009 | Sammour | H04L 1/165 455/450 |
| 2009/0245177 A1* | 10/2009 | Zhao | H04W 60/06 370/328 |

OTHER PUBLICATIONS

3rd Generation Partnership Project: "3GPP TS 36.413 V8.1.0 (Mar. 2008); 3rd Generation Partnership Project; Technical Specification Group Radio Access Network; Evolved Universal Terrestrial Radio Access Network (E-UTRAN); SI Application Protocol (SIAP) (Release 8)"[Online] Mar. 2008, pp. 1-150, XP002539693Retrieved from the Internet:URL:http://www.quintillion.co.jp/3GPP/Specs/36413-810.pdf> [retrieved on Aug. 3, 2009].

"3rd Generation Partnership Project;Technical Specification Group Core Network and Terminals;3GPP System Architecture Evolution;CT WG1 Aspects (Release 8)" SGPP Draft; 24801-070, 3rd Generation Partnership Project (SGPP), Mobile Competence Centre ; 650, Route Deslucioles ; F-06921 Sophia-Antipolis Cedex; France, vol. CT WG1, No. Jeju Island; 20080407, Feb. 25, 2008, pp. 1-86, XP050028126.

Alcatel-Lucent: "Handling of NAS information" 3GPP Draft; R2-080816-NAS-AS-Interaction-V6, 3rd Generation Partnership Project (3GPP), Mobile Competence Centre; 650, Route Deslucioles; F-06921 Sophia-Antipolis Cedex; France, vol. RAN WG2, No. Sorrento, Italy;20080211, Feb. 4, 2008, pp. 1-13, XP050138637.

Ericsson: "CR to 24.801: EPS session management procedure optimisations" 3GPP Draft; CI-080710, 3rd Generation Partnership Project (SGPP), Mobile Competence Centre; 650, Route Deslucioles; F-06921 Sophia-Antipolis Cedex; France, vol. RAN WGS, No. Kansas City, USA; 20080505, Feb. 14, 2008,pp. 1-4, XP050164210 p. 3, line 20-line 24.

Ericsson: "Proposed way forward with NAS/ RRC / SI-AP interactions" 3GPP Draft; R2-081486, 3rd Generation Partnership Project (SGPP), Mobile Competence Centre ; 650, Route Deslucioles ; F-06921 Sophia-Antipolis Cedex; France, vol. RAN WG2, No. Shenzhen, China; 20080331, Mar. 20, 2008, pp. 1-7, XP050139227.

International Search Report and Written Opinion—PCT/US2009/039422, International Search Authority—European Patent Office—Aug. 24, 2009.

"[RAN2#61bis] Ericsson contributions", 3GPP_TSG_RAN_WG2 Archives—Mar. 2008 (#157), [online], <URL:http://list.etsi.org/scripts/wa.exe?A2=ind0803&L=3gpp_tsg_ran_wg2&T=0&P=21885>.

Taiwan Search Report—TW098111402—TIPO—Sep. 27, 2012.

* cited by examiner

SELECTIVE BEARER ESTABLISHMENT IN E-UTRAN/EPS

CROSS-REFERENCE TO RELATED APPLICATIONS

This Application is a continuation of U.S. patent application Ser. No. 12/415,252, filed Mar. 31, 2009, entitled "SELECTIVE BEARER ESTABLISHMENT IN E-UTRAN/EPS," which claimed priority from U.S. Provisional Patent Application Ser. No. 61/042,676, filed Apr. 4, 2008, entitled "HANDLING OF REJECTION OF EPS BEARER SETUP IN E-UTRAN/EPS,"the entireties of both applications being incorporated in their entirety herein by this reference.

BACKGROUND

I. Field

The present disclosure relates generally to wireless communications and more specifically to radio bearer establishment.

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), and/or multi-carrier wireless specifications such as evolution data optimized (EV-DO), one or more revisions thereof, etc., which can utilize evolved universal terrestrial radio access (E-UTRA) to facilitate radio communication between wireless devices. E-UTRA can also be utilized in evolved packet systems (EPS), such as 3GPP LTE.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

In E-UTRA networks, base stations or other access points can establish bearers with mobile devices at a radio communication layer, such as radio resource control (RRC) layer, to support multiple levels of service relating to varying types of communications. The base stations can establish the bearers with the mobile devices based on requests from the core network (e.g., where the core network authorizes the mobile devices for communication based on a network access request). To this end, the network generates and appends a non-access stratum (NAS) message to the bearer setup requests, such that the base stations can receive the requests, initialize the bearers, and forward the NAS message to the mobile devices. The NAS message facilitates setup and subsequent utilization of the bearers by the mobile devices.

In Universal Mobile Telecommunication System (UMTS) networks, a network can establish only one new bearer at one time. In E-UTRA and EPS, multiple new bearers can be established simultaneously. To this end, one possible implementation is that the NAS message relates to multiple bearers and is appended to the bearer setup request, which is generated by the network and transmitted to a base station, using a single NAS packet data unit (PDU) for all bearers. In some cases, the base station is not able to initialize one or more bearers indicated in the bearer setup request (e.g., due to admission control and/or the like), and the base station indicates failure of the entire bearer setup request to the network. Typically, based on receiving the failure, the core network can attempt different combinations of bearers and related NAS messages transmitted in new bearer setup requests until the base station can successfully setup the requested bearers for the mobile device.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

In accordance with one or more embodiments and corresponding disclosure thereof, various aspects are described in connection with facilitating selective bearer setup in evolved universal terrestrial radio access (E-UTRA) or similar networks. In particular, a wireless network can transmit a bearer setup request comprising a list of bearers to be setup to an access point. For each bearer in the list, a separate non-access stratum (NAS) packet data unit (PDU) related to a given bearer can be specified in the request. In this regard, the access point can fail to setup one or more bearers and indicate failure only for those bearers to the network while providing appropriate NAS communications to a mobile device related to those bearers for which setup was successful. Accordingly, the mobile device can receive separate NAS PDUs for each successfully initialized bearer and use information in the NAS message within the PDU to setup a given bearer with the access point.

According to related aspects, a method for establishing multiple radio bearers in wireless communications is provided. The method includes receiving a plurality of NAS messages each corresponding to setting up a radio bearer with an access point. The method also includes setting up at least one radio bearer with the access point, wherein the at least one radio bearer is associated to one of the plurality NAS messages.

Another aspect relates to a wireless communications apparatus. The wireless communications apparatus can include at least one processor configured to receive a RRC message from an access point comprising a list of NAS messages each relating to establishing one of a plurality of radio bearers with the access point. The processor is further configured to establish at least one of the plurality of radio bearers, wherein the at least one radio bearer is associated to one NAS message in the list of NAS messages. The wireless communications apparatus also comprises a memory coupled to the at least one processor.

Yet another aspect relates to a wireless communications apparatus that facilitates establishing selected radio bearers in wireless communications. The wireless communications apparatus can comprise means for receiving, within a single RRC message, a plurality of NAS messages related to establishing radio bearers from an access point. The wireless communications apparatus can additionally include means for establishing at least one radio bearer with the access point, wherein the at least one radio bearer is associated to one of the NAS messages that corresponds to the at least one radio bearer.

Still another aspect relates to a computer program product, which can have a computer-readable medium including code for causing at least one computer to receive a plurality of NAS messages each corresponding to setting up a radio bearer with an access point. The computer-readable medium can also comprise code for causing the at least one computer to setup at least one radio bearer with the access point, wherein the at least one radio bearer is associated to one of the plurality NAS messages.

Moreover, an additional aspect relates to an apparatus. The apparatus can include a NAS receiving component that receives a list of NAS messages related to establishing radio bearers from an access point. The apparatus can further include a bearer setup component that establishes at least one radio bearer with the access point, wherein the at least one radio bearer is associated to one NAS message in the list.

According to further aspects, a method for selectively establishing radio bearers in wireless communications is provided. The method includes receiving a request to establish a plurality of radio bearers comprising a list of NAS messages each linked to one of the plurality of radio bearers from a network component. In addition, the method can include initializing one or more of the plurality of radio bearers and forwarding one or more NAS messages to a mobile device based at least in part on determining which of the NAS messages in the list correspond to the one or more initialized radio bearers.

Another aspect relates to a wireless communications apparatus. The wireless communications apparatus can include at least one processor configured to receive a bearer setup request message from a core wireless network comprising a list of radio bearers to setup along a plurality of NAS message nested within radio bearer entries in the list. The processor is further configured to initialize at least one radio bearer in the list of radio bearers and transmit at least one of the NAS messages nested within a radio bearer entry in the list corresponding to the at least one initialized radio bearer to a mobile device. The wireless communications apparatus also comprises a memory coupled to the at least one processor.

Yet another aspect relates to a wireless communications apparatus that facilitates establishing selected radio bearers in wireless communications. The wireless communications apparatus can comprise means for receiving a request to setup a list of radio bearers where each radio bearer in the list of radio bearers is associated with a disparate NAS message and means for initializing one or more radio bearers in the list of radio bearers. The wireless communications apparatus can additionally include means for forwarding at least one of the NAS messages corresponding to the one or more radio bearers to a mobile device.

Still another aspect relates to a computer program product, which can have a computer-readable medium including code for causing at least one computer to receive, from a network component, a request to establish a plurality of radio bearers comprising a list of NAS messages each linked to one of the plurality of radio bearers. The computer-readable medium can also comprise code for causing the at least one computer to initialize one or more of the plurality of radio bearers. Moreover, the computer-readable medium can comprise code for causing the at least one computer to forward one or more NAS messages to a mobile device based at least in part on determining which of the NAS messages in the list correspond to the one or more initialized radio bearers.

Moreover, an additional aspect relates to an apparatus. The apparatus can include a bearer request receiving component that obtains a request to establish a list of radio bearers wherein each radio bearer indicated in the list of radio bearers includes an associated NAS message and a bearer setup component that initializes one or more radio bearers in the list of radio bearers. The apparatus can further include a NAS forwarding component that provides NAS messages associated with the one or more radio bearers to a mobile device.

Additionally, further aspects relate to a method for selectively establishing radio bearers in wireless communications. The method can include generating a list of radio bearers to setup based at least in part on receiving a network access request from an access point. The method can further include creating a separate NAS message for each entry of the list for setting up an associated radio bearer and transmitting the list of radio bearers and associated NAS messages to the access point.

Another aspect relates to a wireless communications apparatus. The wireless communications apparatus can include at least one processor configured to create a list of radio bearers to setup based at least in part on receiving a network access request from an access point. The processor is further configured to insert a separate NAS message corresponding to each radio bearer entry of the list and transmit the list of radio bearers to the access point. The wireless communications apparatus also comprises a memory coupled to the at least one processor.

Yet another aspect relates to a wireless communications apparatus that facilitates establishing selected radio bearers in wireless communications. The wireless communications apparatus can comprise means for generating separate NAS messages relating to setting up given radio bearers for communication in a wireless network. The wireless communications apparatus can additionally include means for indicating association between the separate NAS messages and the given radio bearers in a bearer setup request and transmitting the bearer setup request to an access point.

Still another aspect relates to a computer program product, which can have a computer-readable medium including code for causing at least one computer to generate a list of radio bearers to setup based at least in part on receiving a network access request from an access point. The computer-readable medium can also comprise code for causing the at least one computer to create a separate NAS message for each entry of the list for setting up an associated radio bearer. Moreover, the computer-readable medium can comprise code for causing the at least one computer to transmit the list of radio bearers and associated NAS messages to the access point.

Moreover, an additional aspect relates to an apparatus. The apparatus can include a NAS message component that generates separate NAS messages relating to setting up given radio bearers for communication in a wireless network. The apparatus can further include a bearer request component that links the separate NAS messages with the given radio bearers in a bearer setup request and transmits the bearer setup request to an access point.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
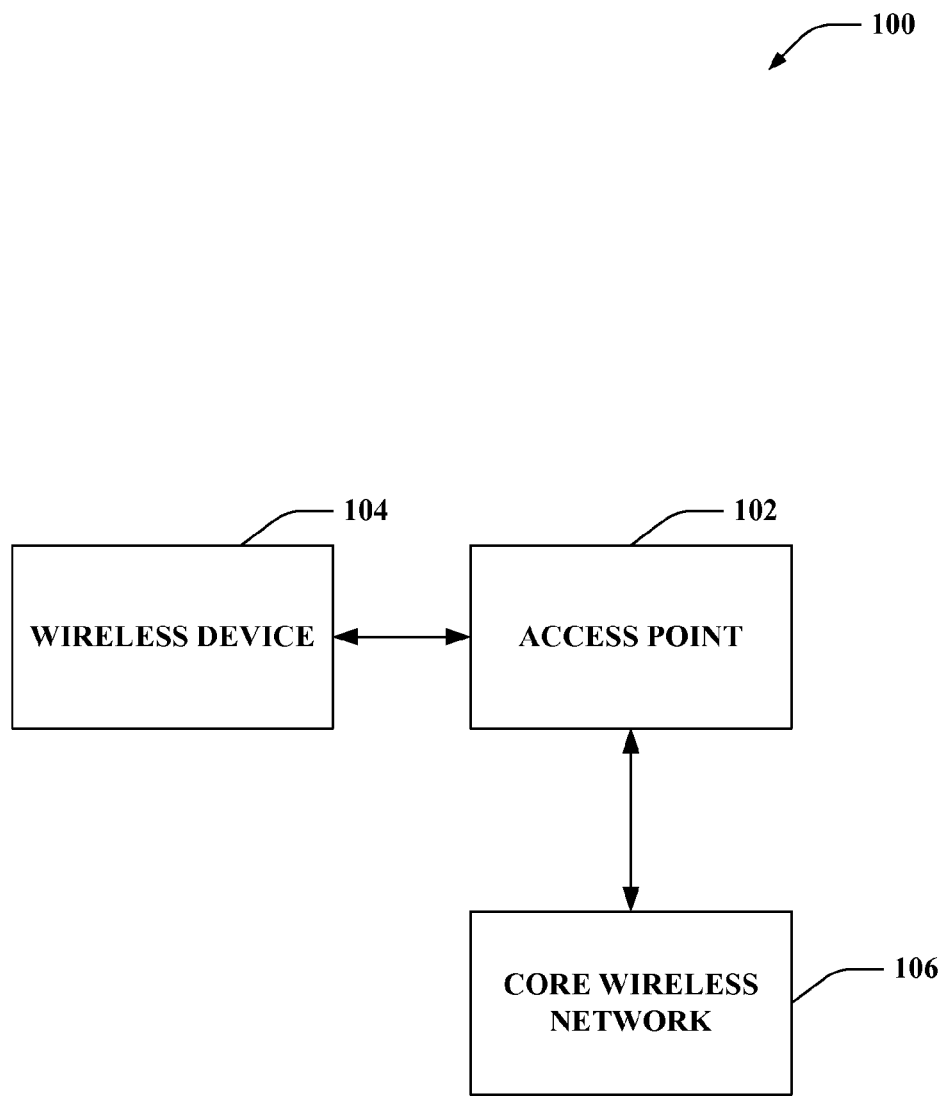
FIG. 1 is a block diagram of a system for selectively establishing radio bearers in wireless communication networks.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point or Evolved Node B (eNB)) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Further, CDMA2000 and UMB are described in documents from an organization named "3rd Generation Partnership Project 2" (3GPP2).

Various aspects will be presented in terms of systems that can include a number of devices, components, modules, and the like. It is to be understood and appreciated that the various systems can include additional devices, components, modules, etc. and/or can not include all of the devices, components, modules etc. discussed in connection with the figures. A combination of these approaches can also be used.

Referring now to the drawings, FIG. 1 illustrates a system 100 that facilitates selective bearer setup in a wireless communications network. In particular, an access point 102 is depicted that provides a wireless device 104 with access to a core wireless network 106. For example, the access point 102 can communicate with the core wireless network 106 over a backhaul, using a network controller, over the air, and/or the like. The wireless device 104 can request establishment of radio communication with the access point 102 to communicate with the core wireless network 106, in one example. The radio communication can be established over a radio resource control (RRC) layer, for example, using access stratum (AS) messages. In one example, the wireless device 104 can formulate the request based at least in part on handing over communication from a disparate access point (not shown) to the access point 102. In an example, the access point 102 and disparate access point can communicate with devices using different protocols, provide different functionalities, communicate with different type of core wireless networks, and/or the like.

Establishing radio communication between the access point 102 and wireless device 104 can include setup of multiple radio bearers where each bearer can, for example, provide a level of service for a given type of communication. In one example, bearers can be established and simultaneously utilized for voice communication, data communication, video communication, audio communication, etc. According to an example, the wireless device 104 can request access to the core wireless network 106 through the access point 102. Upon authorizing the wireless device 104, in one example, the core wireless network 106 can transmit a request to the access point 102 to setup radio bearers with the wireless device 104 to facilitate varying types of communication therewith. The core wireless network 106 can include instructions to the wireless device 104 for utilizing each bearer in non-access stratum (NAS) messages generated with (and/or within) the request to setup radio bearers. Individual NAS messages can be provided and separated in the bearer setup request to allow selective bearer establishment, as described herein.

Thus, for example, upon receiving the bearer setup request, the access point 102 can attempt to initialize the requested bearers. In one example, some initializations can be successful and some unsuccessful; this can depend on a variety of factors including admission control, resource availability, bandwidth capabilities, and/or the like. Where a bearer is successfully setup, the access point 102 can forward the related NAS message to the wireless device 104 allowing the wireless device 104 to establish the bearer with the access point 102 and subsequently communicate thereover. In addition, the access point 102 can indicate successful setup of the bearer to the core wireless network 106, in an example. Where a bearer cannot be successfully setup at the access point 102, the NAS message is not sent to the wireless device 104, and the access point 102 can indicate failure of the bearer setup to the core wireless network 106, in one example. In this regard, bearers can be selectively setup and handled by allowing the access point 102 to determine NAS messages corresponding to the initialized bearers and forward the NAS messages to the wireless device 104.

Figure 2:
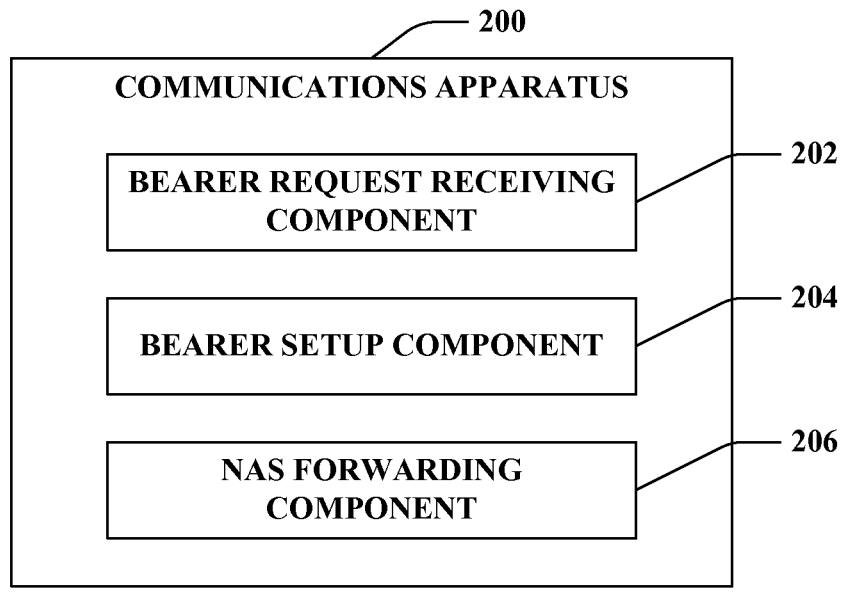
FIG. 2 is an illustration of an example communications apparatus for employment within a wireless communications environment.

Referring next to FIG. 2, a communications apparatus 200 that can participate in a wireless communications network is illustrated. The communications apparatus 200 can be a mobile device, base station, a portion thereof, or substantially any device that can provide access to a wireless network. The communications apparatus 200 can include a bearer request receiving component 202 that obtains a bearer setup request from one or more core network components (not shown), a bearer setup component 204 that initializes one or more bearers indicated in a bearer setup request, and a NAS forwarding component 206 that provides NAS messages received from a core network component to one or more mobile devices (not shown).

According to an example, the bearer request receiving component 202 can receive a bearer setup request in a wireless network. The bearer setup request can be received, for example, in response to a request to access the wireless network. In one example, the wireless network can be an E-UTRA network, and the bearer setup request can relate to one or more evolved packet system (EPS) bearers. The bearer setup request can comprise, for example, information regarding desired bearers as well as NAS messages comprising instructions for utilizing the bearers at a mobile device. There can be one or more NAS messages corresponding to each bearer to provide selective bearer setup, as described, and the NAS messages can be linked to the given bearers (e.g., nested in appropriate bearer information, linked in the bearer information, linked using a list that matches NAS messages to bearers, and/or the like).

Upon receiving the bearer setup request, the bearer setup component 204 can initialize one or more of the bearers for use by one or more mobile devices. For bearers successfully setup, the bearer setup component 204 can provide related NAS messages to the NAS forwarding component 206. The NAS forwarding component 206 can transmit the NAS messages to the mobile device to facilitate establishing communication using the radio bearers. In addition, in one example, the bearer setup component 204 can report successful bearer setup to the core network component. For bearers that are not successfully setup, the bearer setup component 204 can ignore and/or discard related NAS messages and/or indicate failure to the core network component, as described.

Figure 3:
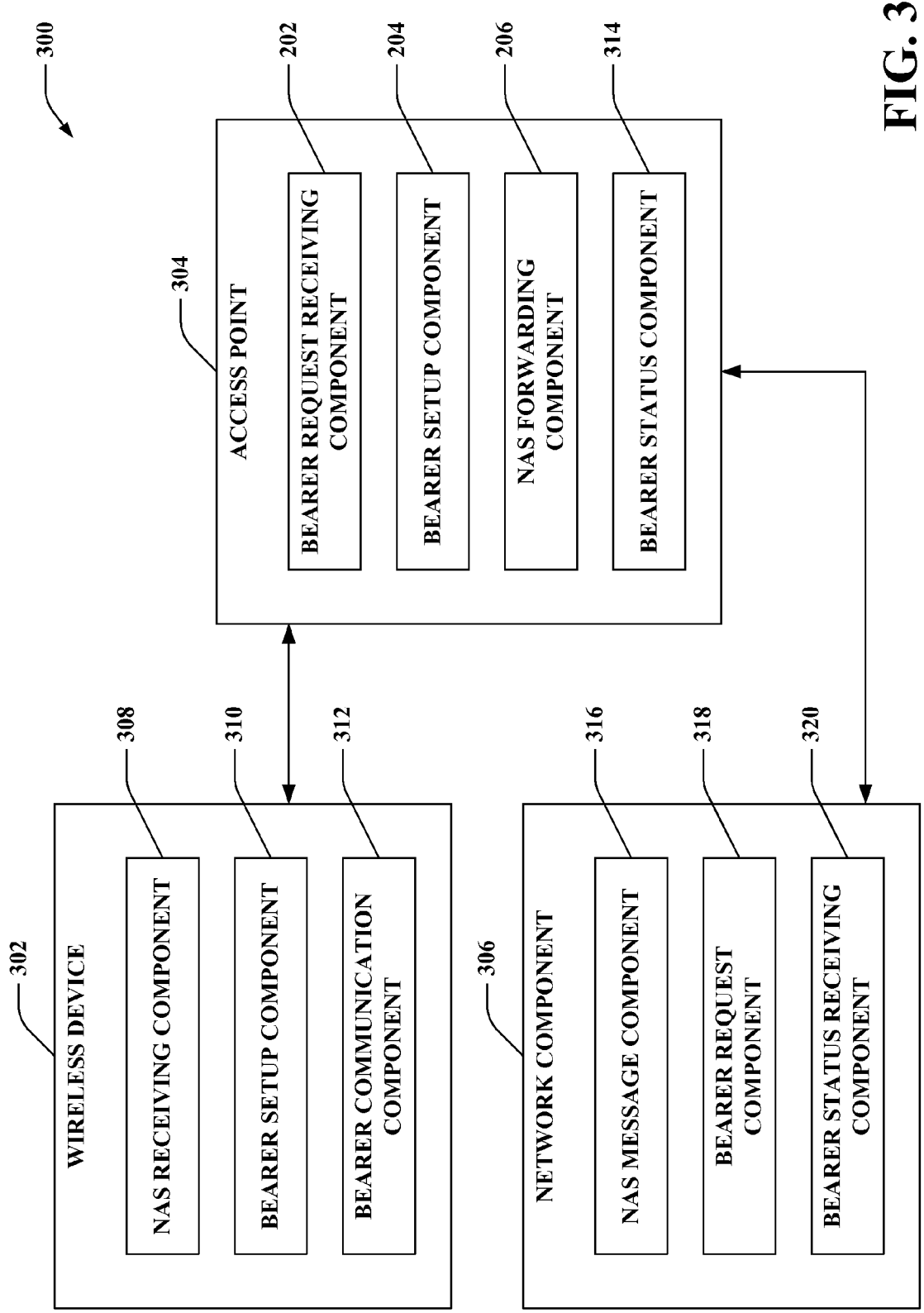
FIG. 3 illustrates an example wireless communication network that effectuates selective establishment of radio bearers.

Now referring to FIG. 3, illustrated is a wireless communications system 300 that facilitates individual bearer setup in wireless networks. Wireless device 302 can be a mobile device (including not only independently powered devices, but also modems, for example), a base station, and/or portion thereof. Access point 304 can similarly be a mobile access point, a base station, or substantially any access point that provides access to a wireless network. In one example, the wireless device 302 and access point 304 can communicate using peer-to-peer or ad hoc technology where the devices 302 and 304 are of similar type. Moreover, system 300 can be a MIMO system and/or can conform to one or more wireless network system specifications (e.g., EV-DO, 3GPP, 3GPP2, 3GPP LTE, WiMAX, etc.). Also, the components and functionalities shown and described below in the wireless device 302 can be present in the access point 304 as well and vice versa, in one example; the configuration depicted excludes these components for ease of explanation. In particular, access point 304 provides access to a network component 306, which participates in a wireless network. The network component 306 can be a mobility management entity (MME), gateway, and/or other network component that provides access to the wireless network. In one example, the wireless communication system 300 can be an E-UTRA system or network.

Wireless device 302 can include a NAS receiving component 308 that receives a list of NAS messages including instructions for establishing related radio bearers with one or more access points, a bearer setup component 310 that performs bearer establishment, wherein one radio bearer is associated to one NAS message of the list, and a bearer communication component 312 that facilitates communicating over the bearers to receive access to a wireless network. Access point 304 includes a bearer request receiving component 202 that receives a request for bearer setup from a wireless network, as described, a bearer setup component 204 that initializes one or more bearers in the bearer setup request, a NAS forwarding component 206 that transmits NAS messages related to successfully setup bearers to one or more mobile devices, and a bearer status component 314 that reports whether bearer setup is successful or unsuccessful. Network component 306 includes a NAS message component 316 that generates NAS messages related to setting up bearers with an access point, a bearer request component 318 that creates and transmits one or more requests for bearer setup and includes related NAS messages, and a bearer status receiving component 320 that obtains status indications with respect to bearer setup at an access point.

According to an example, wireless device 302 can request wireless network access from access point 304. Access point 304 can communicate with the network component 306 to establish such access. The network component 306, in response, can provide information related to establishing bearers to facilitate multiple levels of service for the wireless device 302. In one example, the levels of service can be utilized for various communication technologies, as described, to provide diverse communication functionality while efficiently managing resources. For example, separate bearers can be established for voice data, text data, video data, picture data, and/or the like, as mentioned previously (e.g., where a bearer for video data can have a higher quality of service than a bearer for text data). Moreover, such bearer establishment can be necessary when establishing communication with an E-UTRA network, such as 3GPP LTE (e.g., initially and/or from handing over from one or more networks using different technology, such as EVDO, 3GPP2, and/or the like). Moreover, the E-UTRA network can also be an EPS network, as mentioned.

To facilitate establishing the multiple bearers, the bearer request component 318 can determine a plurality of bearers requiring setup to allow desired communication with the wireless device 302. The NAS message component 316 can generate a NAS message for each bearer to the wireless device 302 comprising instructions for setting up the given bearer with the access point 304 providing wireless network access. The bearer request component 318 can create a bearer setup request message having each NAS message linked (or otherwise indicate association) to a related bearer. The linkage can include nesting related NAS messages or links thereto in corresponding entries of a list of the bearers, indicating linkage in an array, and/or the like. The bearer request component 318 can transmit the bearer setup request to the wireless device 304; this can be a S1 interface application protocol (S1-AP) message, in one example. In addition, for example, the bearer request message can have the following format.

| IE/Group Name | Range |
|---|---|
| Message Type | |
| MME UE S1AP ID | |
| eNB UE S1AP ID | |
| UE Aggregate Maximum Bit Rate | |
| System architecture evolution (SAE) Bearer to be Setup List | |
| >SAE Bearer To Be Setup Item IEs | 1 to <maxnoof SAEbearers> |
| >> SAE Bearer ID | |
| >> SAE Bearer Level QoS parameters | |
| >> Transport Layer Address | |
| >> GTP-TEID | |
| >> NAS-PDU | | where maxnoofSAEbearers is a maximum number of bearers that can be setup and GTP-TEID is a general packet radio services (GPRS) tunneling protocol tunnel end point identifier. As indicated by indenting above ('>' for a first level, '>>' for a second level), for each bearer in the list of SAE bearers to be setup, there is a corresponding NAS PDU comprising NAS messages for setting up the given bearer at the wireless device 302, as described.

The bearer request receiving component 202 can obtain the bearer setup request transmitted by the network component 306 and can determine bearers to setup along with associated NAS messages for forwarding to the wireless device 302. The bearer setup component 204 can initialize one or more of the bearers requested in the setup request. In one example, the request can specify a quality of service for the bearers, and the bearer setup component 204 can attempt to initialize the bearers according to the quality of service. For bearers successfully setup by the bearer setup component, the NAS forwarding component 206 can transmit the associated NAS PDU(s) to the wireless device 302 (e.g., along with an identity related to the bearer); the NAS PDUs can be sent individually and/or in a list, for example. For bearers that are not successfully setup by the bearer setup component 204 (e.g., due to admission control, etc.), the NAS forwarding component 206 does not send the related NAS PDU(s). The bearer status component 314 can indicate the successfully and/or unsuccessfully setup bearers to the network component 306. In one example, these can be sent as lists, arrays of indicators, and/or the like. The bearer status receiving component 320 can obtain the setup results. It is to be appreciated that the network component 306 can reattempt setup of bearers not successfully setup from the access point 304 or a disparate access point.

The NAS receiving component 308 can receive the NAS messages relating to setting up initialized radio bearers with the access point 304; as mentioned, the messages can be transmitted individually or in a list or other grouping, for example. The bearer setup component 310 can process the NAS messages from the network component 306 to setup corresponding bearers with the access point 304, and the bearer communication component 312 can facilitate communicating over the bearers to access the wireless network. In one example, the NAS forwarding component 206 can transmit the NAS messages to the wireless device 302 in an RRC layer connection initiation or reconfiguration message. In this example, upon receipt, the NAS receiving component 308 can forward the NAS messages to upper layers to facilitate bearer establishment. In addition, the wireless device 302 can communicate with the access point 304 over the bearers, once established, to receive one or more services in the wireless network.

Figure 4:
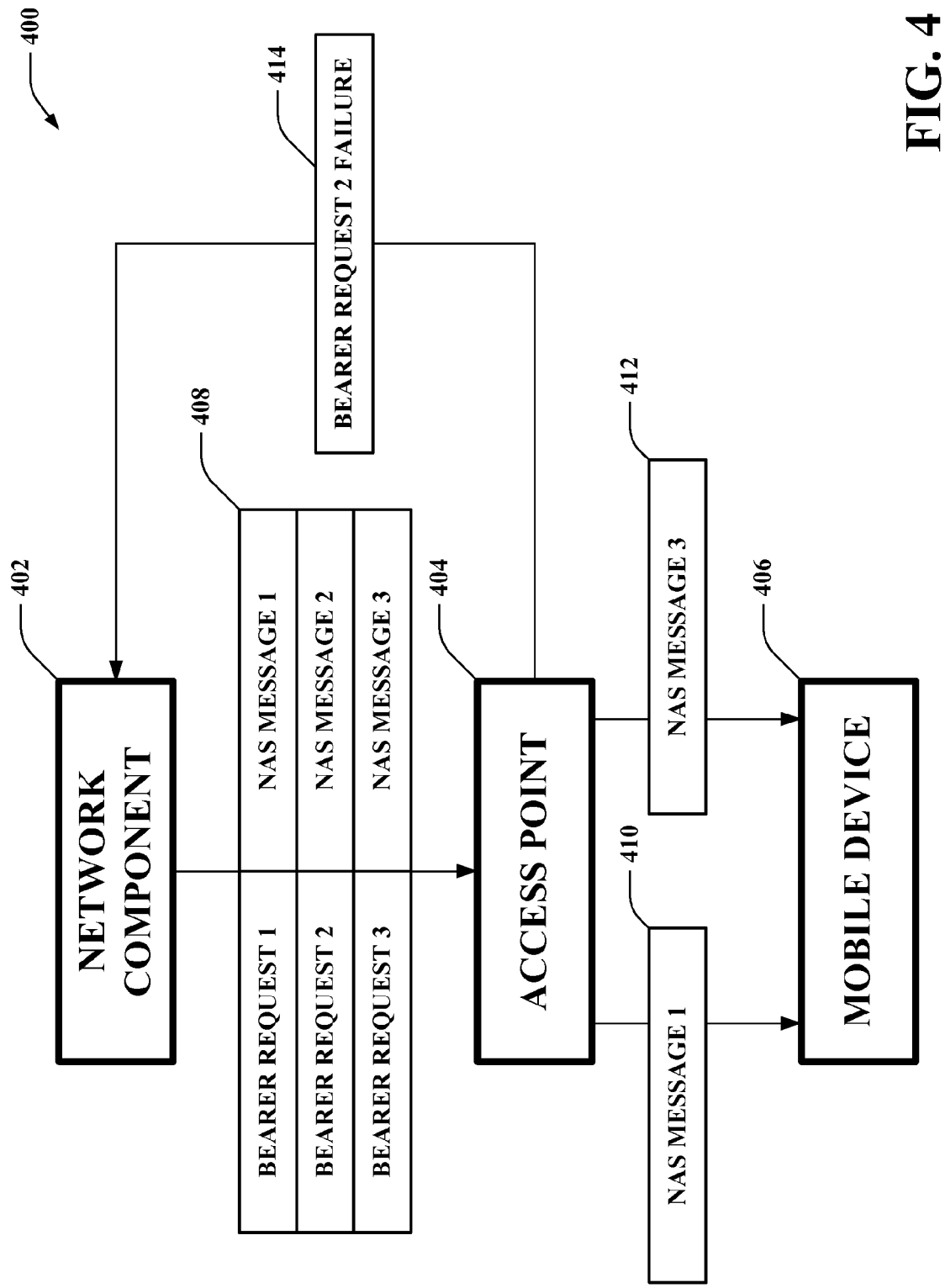
FIG. 4 illustrates an example wireless communication system that forwards non-access stratum (NAS) messages only for initialized bearers.

Referring to FIG. 4, a wireless communications system 400 is illustrated that provides selective radio bearer establishment. In particular, a network component 402 is shown that transmits a message to an access point 404 that can further provide a portion of the message to a mobile device 406. As described, the network component 402 can be an MME, gateway, or other network component that provides service to the access point 404, which can allow mobile device 406 to access the wireless network. As depicted, the network component 402 can transmit a bearer setup request 408 to the access point. The bearer setup request 408, in this example, comprises three bearer requests, each of which can be associated with a radio bearer providing a different quality of service. Each bearer request in the bearer setup request 408 is associated with a NAS message, which can be a communication for the mobile device to utilize in establishing the bearers with the access point 404. Associating each bearer request with a NAS message, as shown in the bearer setup request 408, allows for selective bearer establishment such that bearers that cannot be established can fail while others can succeed.

Upon receiving the bearer setup request 408, the access point 404 can attempt to setup bearers according to bearer request 1, bearer request 2, and bearer request 3. In this example, access point 404 is able to initialize bearer request 1 and bearer request 3, and accordingly forwards the associated NAS messages, NAS message 1 410 and NAS message 3 412, to the mobile device 406. As described, the mobile device 406 can utilize NAS message 1 410 to establish bearer 1 with the access point 404 and NAS message 3 412 to establish bearer 3 with the access point 404. Though shown as separate transmissions, it is to be appreciated that the access point 404 can transmit NAS message 1 410 and NAS message 3 412 as a single message with a list or other structure to allow separation of the messages. Additionally, the access point 404 can transmit a bearer request 2 failure message 414 back to the network component 402 to indicate that it was unable to initialize bearer 2 (e.g., due to admission control, lack of resources, lack of support, and/or the like). Also, though not shown, it is to be appreciated that the access point 404 can transmit bearer success messages to the network component 402 relating to bearer 1 and bearer 3.

Figure 5:
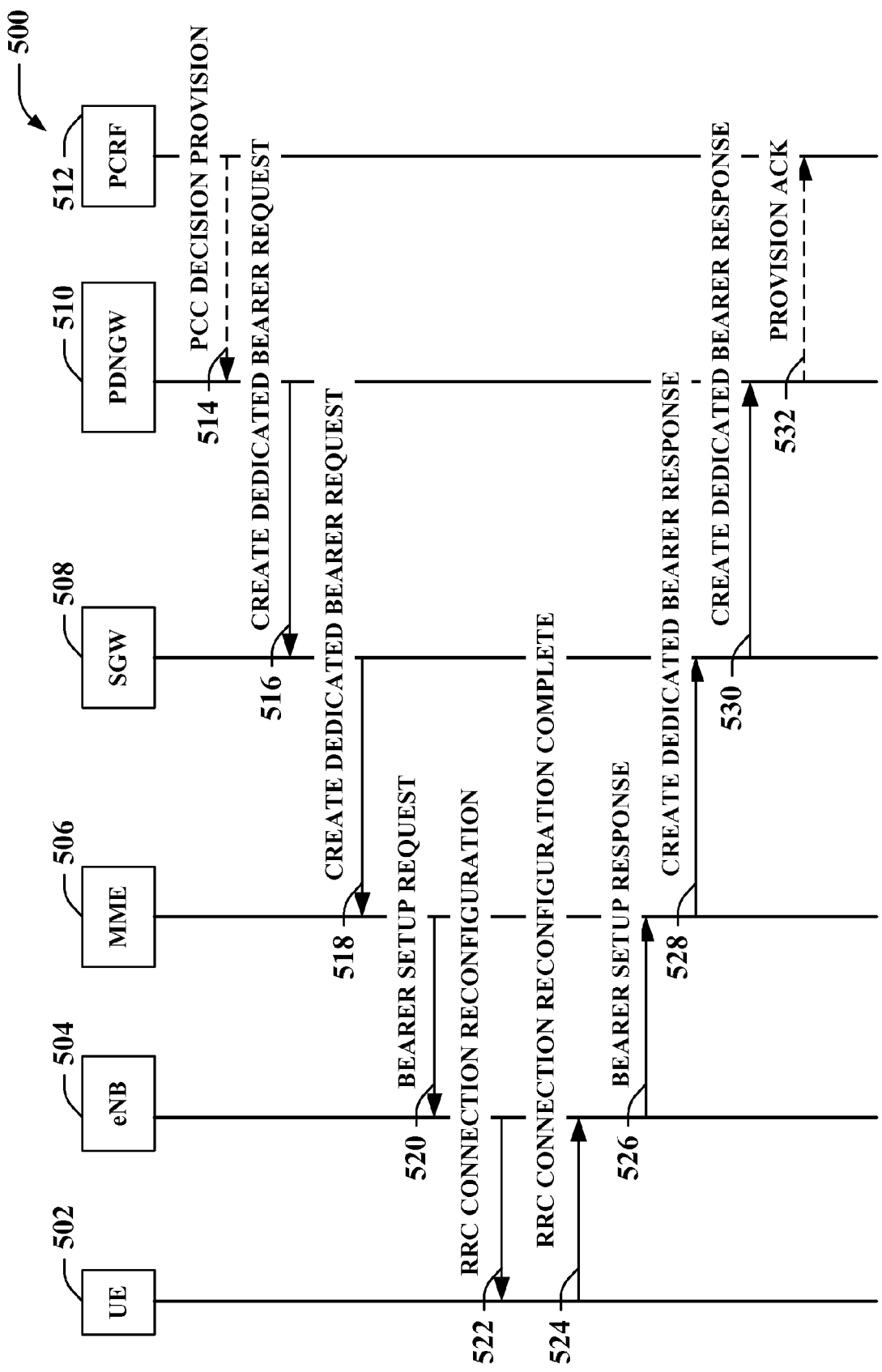
FIG. 5 illustrates an example wireless communication system that facilitates radio bearer establishment.

Turning now to FIG. 5, a wireless communication network 500 is displayed that facilitates establishing wireless network access for a UE. A UE 502 is provided that can communicate with an eNB 504 to receive network access. The eNB 504 communicates with an MME 506 that manages mobility modes. The MME 506 communicates with a serving gateway (SGW) 508 of the wireless network, which can leverage a packet data network gateway (PDNGW) 510 to receive policy information from a policy charging and rules function (PCRF) 512. The foregoing components can communicate, as described herein, to provide wireless network access. In one example, though not shown, the UE 502 can request access to the wireless network, and the request can move between the components until received by the PCRF 512.

Based on the UE 502 requesting access, for example, the PCRF 512 can determine whether the UE 502 is authorized to access the wireless network and can render a policy charging and control (PCC) decision provision 514, which can comprise one or more PCC rules, to the PDNGW 510. Based on the rules, the PDNGW 510 can transmit a request to create one or more dedicated radio bearers 516 to the SGW 508, which can forward the request 518 to the MME 506. The MME 506 can determine which bearers to request, create separate related NAS messages for establishing the bearers, and include the separate NAS messages in individual NAS message PDUs in a list of bearers. The MME 506 can transmit the list of bearers and associated NAS messages in a bearer setup request 520 to the eNB 504. The eNB 504 can initialize one or more of the bearers and can transmit NAS messages related to successfully initialized bearers to the UE 502 in RRC connection reconfiguration message 522.

The UE 502 can receive the RRC connection reconfiguration message 522 and can process the NAS messages to establish the bearers. Once the bearers are established, in one example, the UE 502 can transmit an RRC connection reconfiguration complete message 524 to the eNB 504. Upon receiving the message 524, the eNB can transmit a bearer setup response message 526 to the MME 506. As described, this message 526 can comprise a list of bearers that were not successfully established and/or a list of bearers that were successfully established. MME 506 can transmit a create dedicated bearer response message 528 to the SGW 508 for forwarding to the PDNGW 510 in message 530. This message can optionally also include success/failed radio bearer information, in one example. PDNGW 510 can transmit a provision acknowledgement 532 to the PCRF 512.

Figure 6:
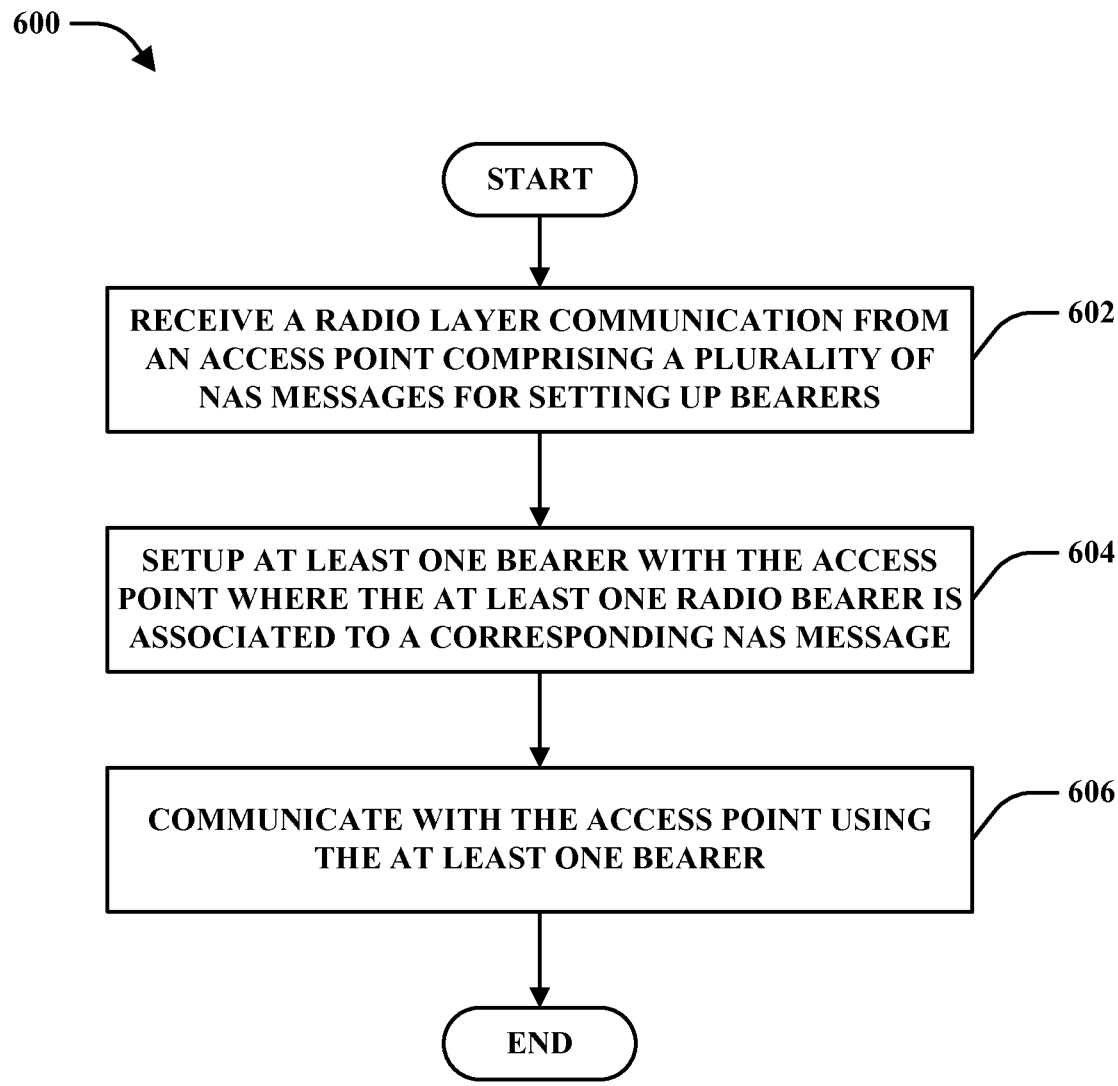
FIG. 6 is a flow diagram of an example methodology that facilitates establishing multiple radio bearers according to received NAS messages.
Figure 7:
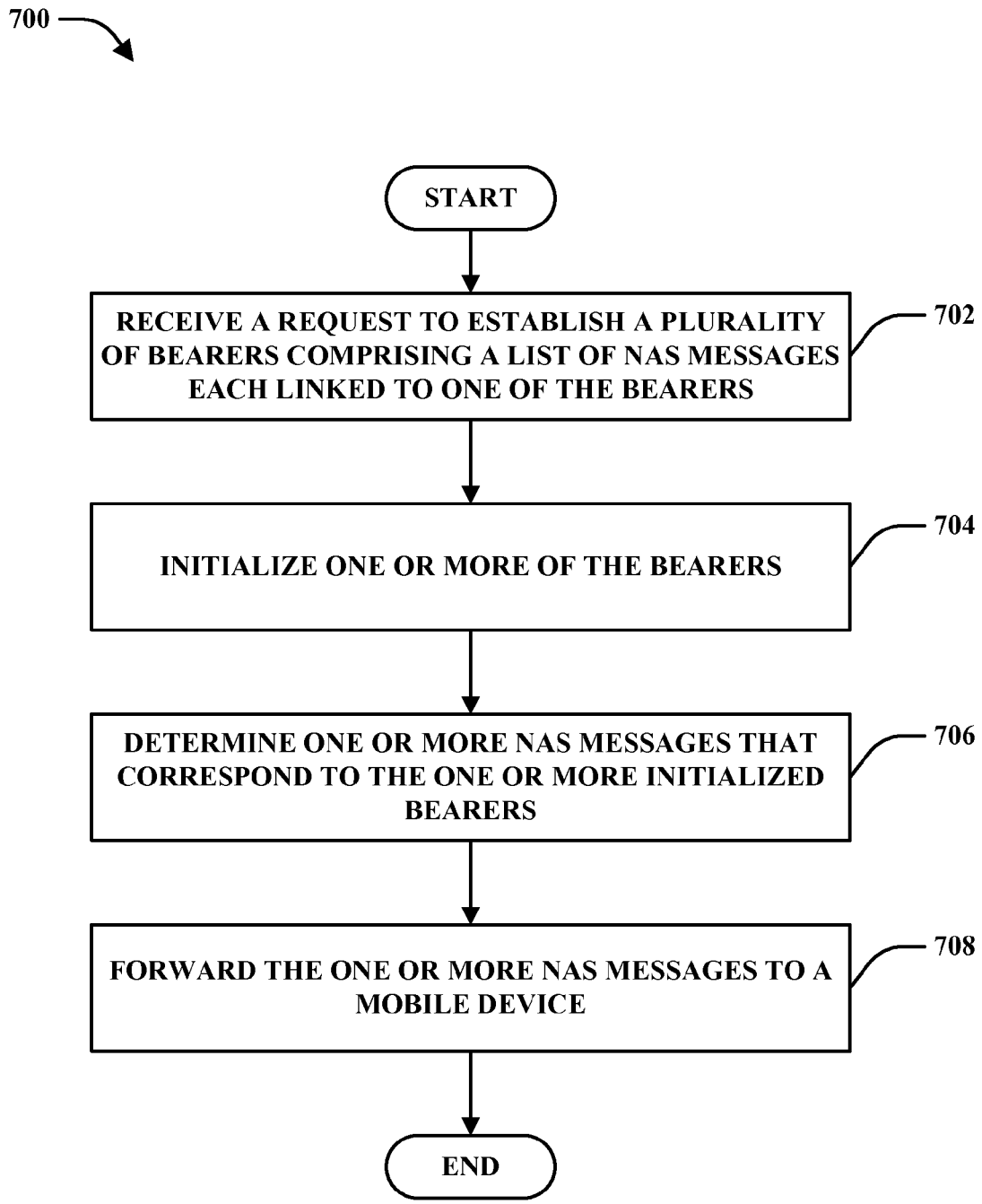
FIG. 7 is a flow diagram of an example methodology that forwards NAS messages for successfully initialized radio bearers.
Figure 8:
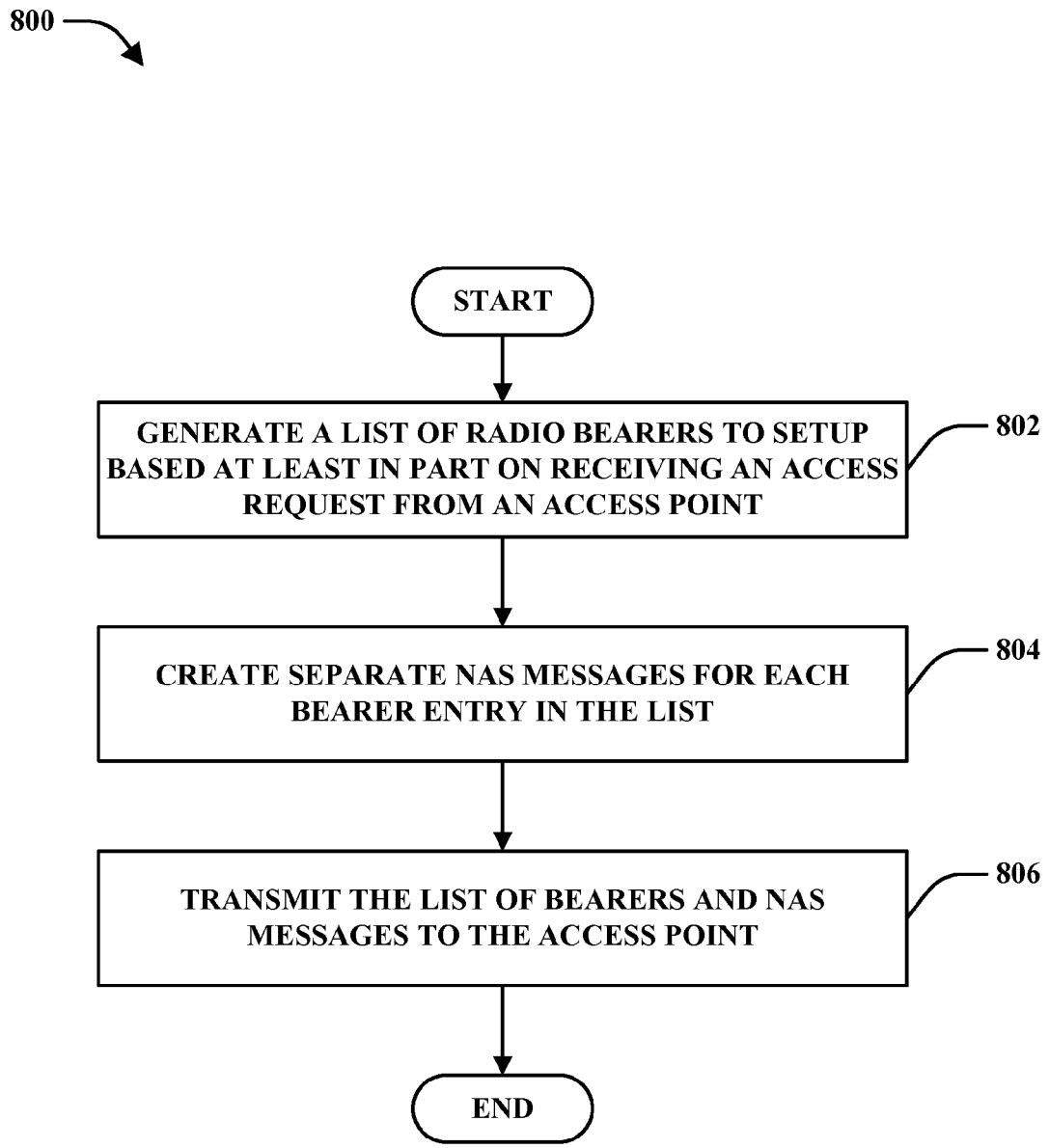
FIG. 8 is a flow diagram of an example methodology for requesting radio bearer setup including separate NAS messages for each bearer.

Referring now to FIGS. 6-8, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

With reference to FIG. 6, illustrated is a methodology 600 for establishing radio bearers with an access point. At 602, a radio layer communication is received from an access point comprising a plurality of NAS messages for setting up bearers. As described, the NAS message can be originally generated by a core network component and can comprise instructions for establishing bearers with the access point. In addition, each NAS message can be received in its own PDU, in one example. At 604, at least one bearer can be setup with the access point, where the at least one radio bearer is associated to a corresponding NAS message. Thus, separate messages are received for each bearer, and each bearer can be setup according to its respective message. At 606, that access point can be communicated with using the at least one radio bearer. In this regard, selective bearer setup is provided based on received NAS messages for the given bearers.

Turning to FIG. 7, a methodology 700 is illustrated that sets up bearers for communication in wireless networks. At 702, a request can be received to establish a plurality of bearers comprising a list of NAS messages each linked to one of the bearers. This can be received from a core wireless network, in one example, where the NAS messages are each in a separate NAS PDU. In another example, the NAS messages can be embedded in a list of the bearers such that each bearer entry in the list has its own related NAS message(s) enumerated in the list entry. At 704, one or more of the bearers can be initialized. As described, some of the bearers may not be initialized successfully, and this can be based on a variety of factors including admission control, available resources, network capabilities, and/or the like. At 706, one or more NAS messages that correspond to the one or more initialized bearers can be determined, and at 708, the one or more NAS messages can be forwarded to a mobile device. Thus, NAS messages related to bearers that cannot be successfully initialized are not sent to the mobile device, in one example. By providing the NAS messages for successfully initialized bearers, selective bearer establishment is provided.

FIG. 8 illustrates a methodology 800 for allowing selective establishment of radio bearers in wireless communications. At 802, a list of radio bearers to setup can be generated based at least in part on receiving an access request from an access point. As described, the access request can initiate at a mobile device seeking access to a wireless network. At 804, separate NAS messages can be created for each bearer entry in the list. The NAS messages, as mentioned, can be each be created in an individual NAS PDU, which can be embedded into or otherwise linked to a given entry in the list. This allows for separate bearer establishment, as described, since a portion of the bearers can succeed while a different portion can fail. At 806, the list of bearers and NAS messages can be transmitted to the access point.

It will be appreciated that, in accordance with one or more aspects described herein, inferences can be made regarding determining whether certain bearers can be established, whether to retry establishing bearers that could not be established, etc. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 9:
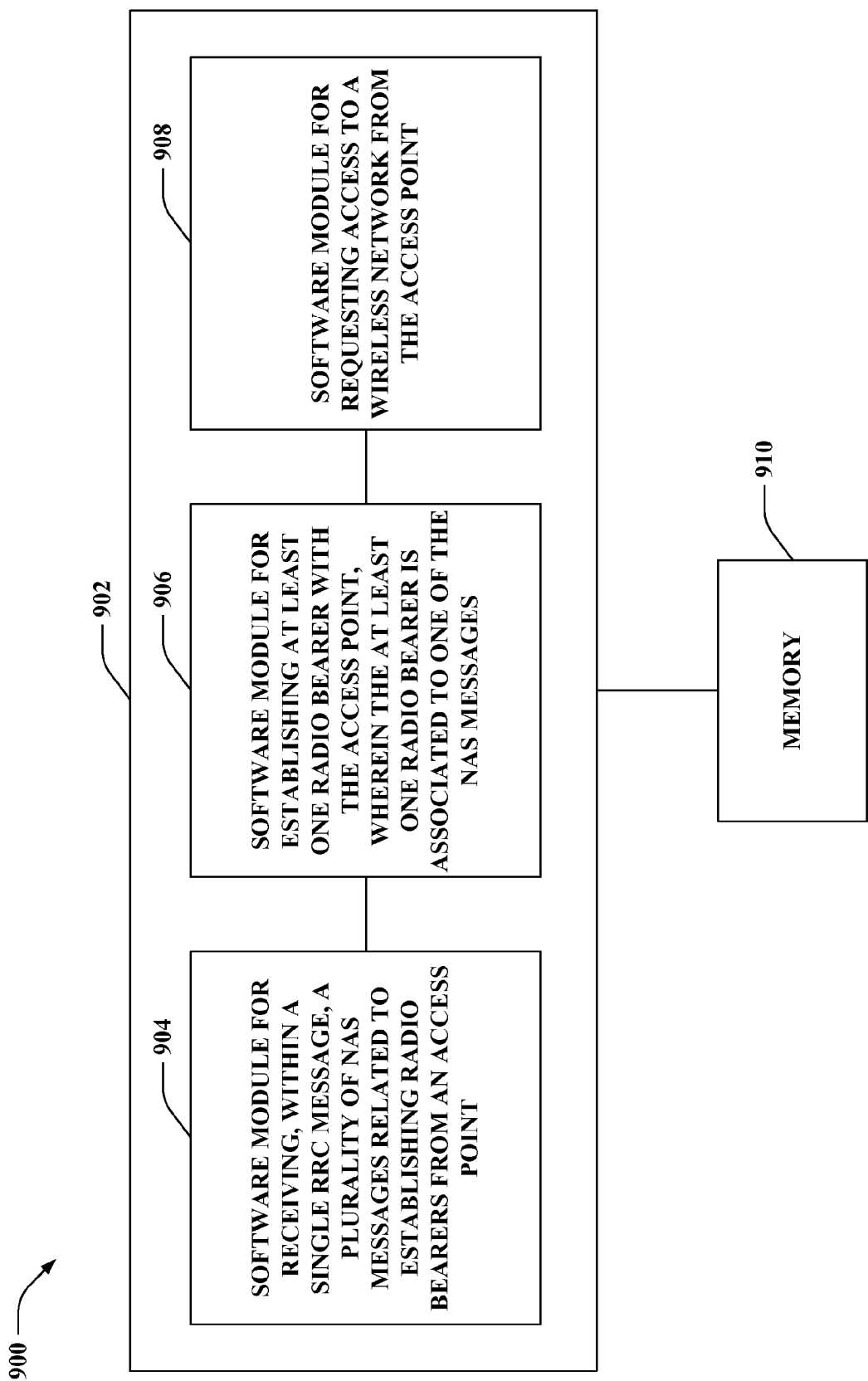
FIG. 9 is a block diagram of an example apparatus that facilitates establishing radio bearers according to received NAS messages.

With reference to FIG. 9, illustrated is a system 900 that establishes bearers with an access point based on messages received therefrom. For example, system 900 can reside at least partially within a base station, mobile device, etc. It is to be appreciated that system 900 is represented as including functional blocks, which can be functional blocks that represent functions implemented by a processor, software, or combination thereof (e.g., firmware). System 900 includes a logical grouping 902 of software modules that can act in conjunction. For instance, logical grouping 902 can include a software module for receiving, within a single RRC message, a plurality of NAS messages related to establishing radio bearers from an access point 904. For example, the NAS messages can be specified by a core network component and forwarded by the access point to facilitate establishing bearers with the access point. Further, logical grouping 902 can comprise a software module for establishing at least one radio bearer with the access point, wherein the at least one radio bearer is associated to one of the NAS messages 906. As described, by having separate NAS messages for each radio bearer, the access point can initialize a portion of the bearers, and the system 900 can setup the portion of bearers based on the received NAS messages. Furthermore, logical grouping 902 can include a software module for requesting access to a wireless network from the access point 908. In one example, the NAS messages can be received based at least in part on the access request. Additionally, system 900 can include a memory 910 that retains instructions for executing functions associated with software modules 904, 906, and 908. While shown as being external to memory 910, it is to be understood that one or more of software modules 904, 906, and 908 can exist within memory 910.

Figure 10:
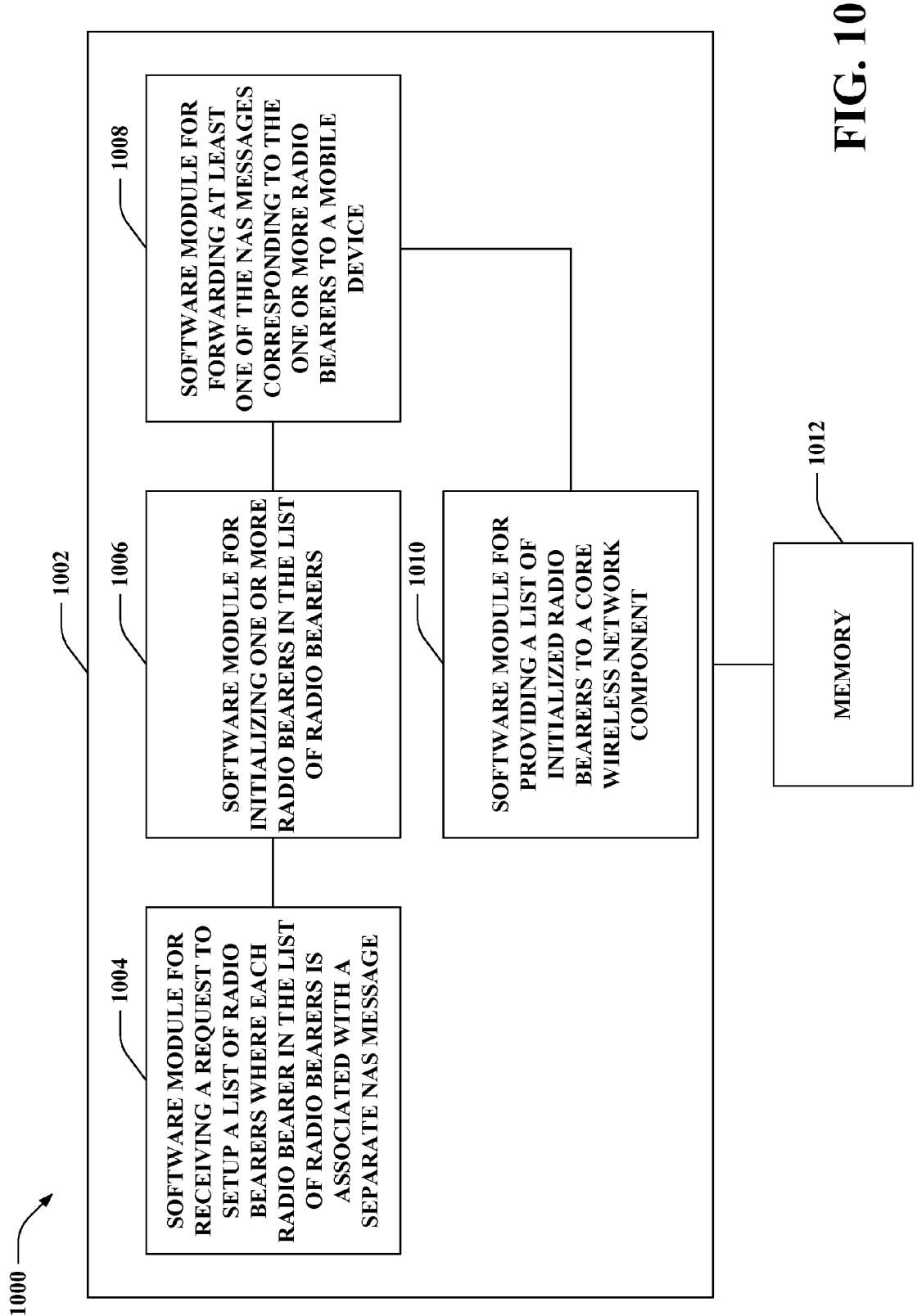
FIG. 10 is a block diagram of an example apparatus that facilitates receiving bearer setup requests and selectively establishing a portion of the bearers.

With reference to FIG. 10, illustrated is a system 1000 that selectively establishes radio bearers in wireless networks. For example, system 1000 can reside at least partially within a base station, mobile device, or another device that provides access to a wireless network. It is to be appreciated that system 1000 is represented as including functional blocks, which can be functional blocks that represent functions implemented by a processor, software, or combination thereof (e.g., firmware). System 1000 includes a logical grouping 1002 of software modules that can act in conjunction. For instance, logical grouping 1002 can include a software module for receiving a request to setup a list of radio bearers where each radio bearer in the list of radio bearers is associated with a disparate NAS message 1004. For example, the NAS messages can be linked to given list entries, embedded within given list entries, and/or the like. Further, logical grouping 1002 can comprise a software module for initializing one or more radio bearers in the list of radio bearers 1006. As described, initialization can fail for some radio bearers based on admission control, available resources, etc.

Furthermore, logical grouping 1002 can include a software module for forwarding at least one of the NAS messages corresponding to the one or more radio bearers to a mobile device 1008. Thus, selective bearer establishment is provided where a mobile device can be instructed to establish the successfully initialized bearers via the NAS messages. Moreover, logical grouping 1002 can include a software module for providing a list of initialized radio bearers to a core wireless network component 1010. In this regard, a status can be reported back to the wireless network. Also, software module 1010 can also provide a list of bearers for which initialization failed to the core wireless network component. Additionally, system 1000 can include a memory 1012 that retains instructions for executing functions associated with software modules 1004, 1006, 1008, and 1010. While shown as being external to memory 1012, it is to be understood that one or more of software modules 1004, 1006, 1008, and 1010 can exist within memory 1012.

Figure 11:
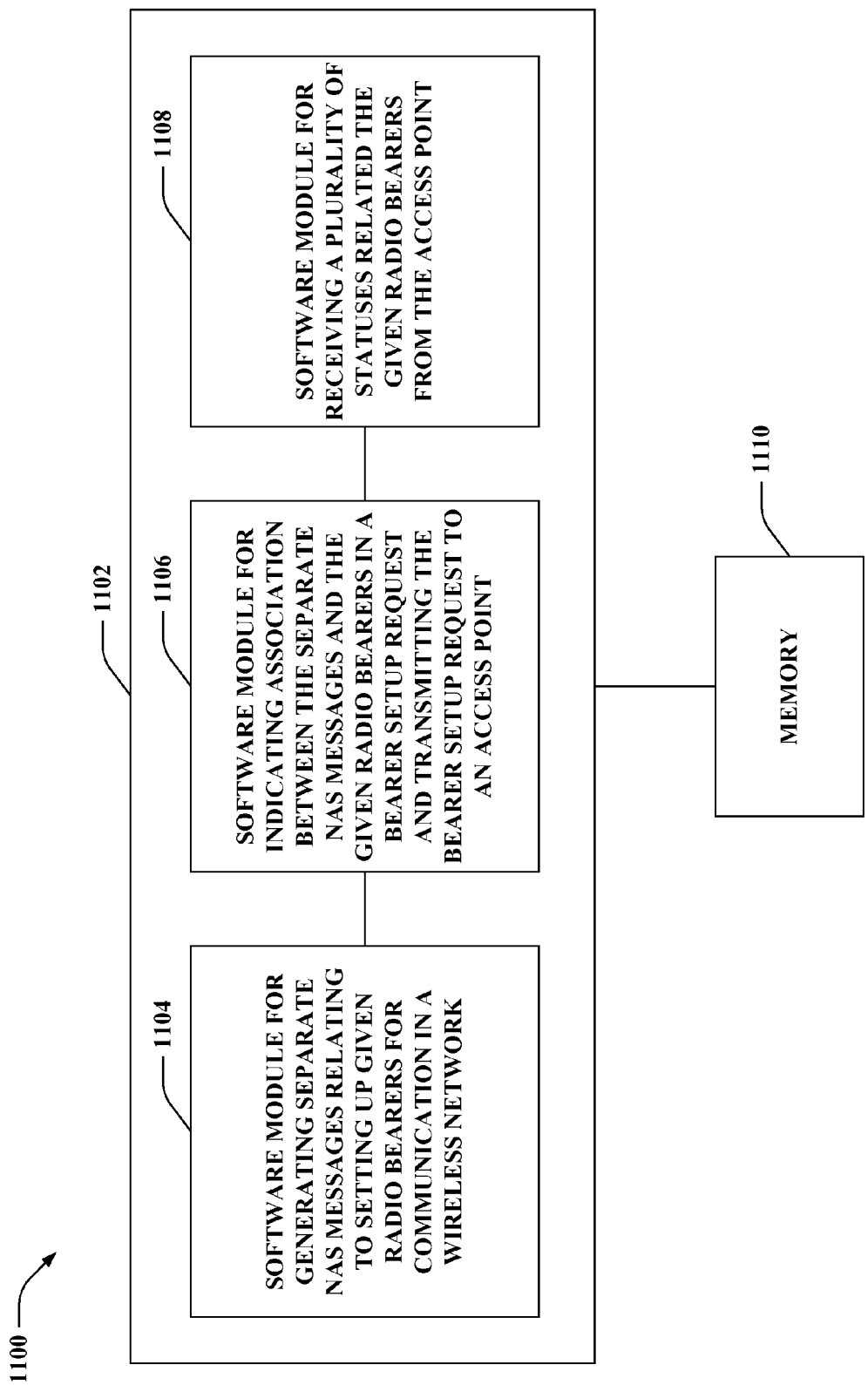
FIG. 11 is a block diagram of an example apparatus that facilitates requesting bearer establishment in wireless communications.

With reference to FIG. 11, illustrated is a system 1100 that allows selective bearer establishment in wireless communication networks. For example, system 1100 can reside at least partially within an MME, gateway, other core network components, etc. It is to be appreciated that system 1100 is represented as including functional blocks, which can be functional blocks that represent functions implemented by a processor, software, or combination thereof (e.g., firmware). System 1100 includes a logical grouping 1102 of software modules that can act in conjunction. For instance, logical grouping 1102 can include a software module for generating separate NAS messages relating to setting up given radio bearers for communication in a wireless network 1104. As described, the NAS messages can be directed to mobile devices and can comprise instructions for establishing the bearers with an access point. Further, logical grouping 1102 can comprise a software module for indicating association between the separate NAS messages and the given radio bearers in a bearer setup request and transmitting the bearer setup request to an access point 1106.

For example, the indicated association can include linking the NAS messages to the radio bearers, such as by embedding the NAS messages in bearer information within the bearer setup request, providing links to the NAS messages, and/or the like. Furthermore, logical grouping 1102 can include a software module for receiving a plurality of statuses related to the given radio bearers from the access point 1108. Thus, successful and unsuccessful bearer initializations can be indicated by the access point. Additionally, system 1100 can include a memory 1110 that retains instructions for executing functions associated with software modules 1104, 1106, and 1108. While shown as being external to memory 1110, it is to be understood that one or more of software modules 1104, 1106, and 1108 can exist within memory 1110.

Figure 12:
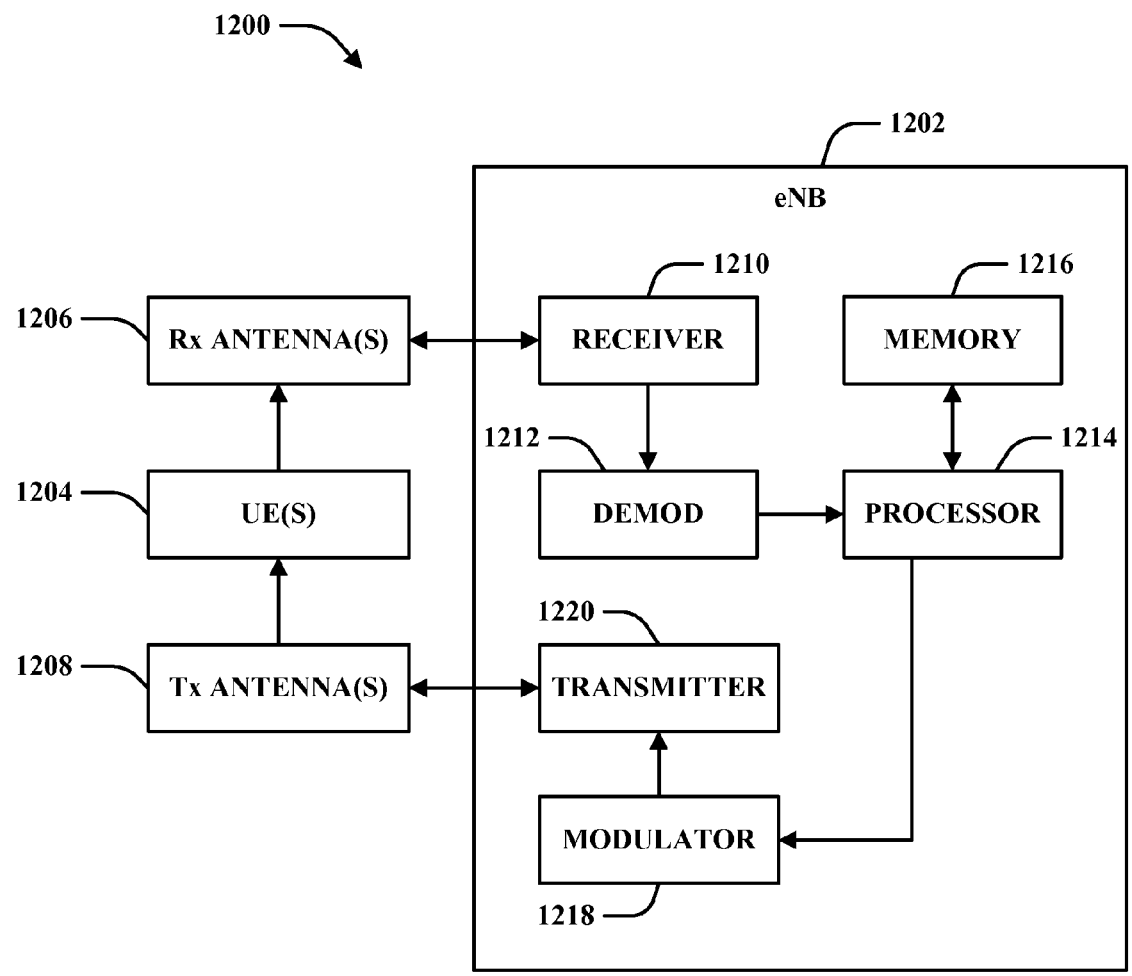
FIGS. 12-13 are block diagrams of example wireless communication devices that can be utilized to implement various aspects of the functionality described herein.

FIG. 12 is a block diagram of a system 1200 that can be utilized to implement various aspects of the functionality described herein. In one example, system 1200 includes a base station or eNB 1202. As illustrated, eNB 1202 can receive signal(s) from one or more UEs 1204 via one or more receive (Rx) antennas 1206 and transmit to the one or more UEs 1204 via one or more transmit (Tx) antennas 1208. Additionally, eNB 1202 can comprise a receiver 1210 that receives information from receive antenna(s) 1206. In one example, the receiver 1210 can be operatively associated with a demodulator (Demod) 1212 that demodulates received information. Demodulated symbols can then be analyzed by a processor 1214. Processor 1214 can be coupled to memory 1216, which can store information related to code clusters, access terminal assignments, lookup tables related thereto, unique scrambling sequences, and/or other suitable types of information. In one example, eNB 1202 can employ processor 1214 to perform methodologies 600, 700, and/or other similar and appropriate methodologies. eNB 1202 can also include a modulator 1218 that can multiplex a signal for transmission by a transmitter 1220 through transmit antenna(s) 1208.

Figure 13:
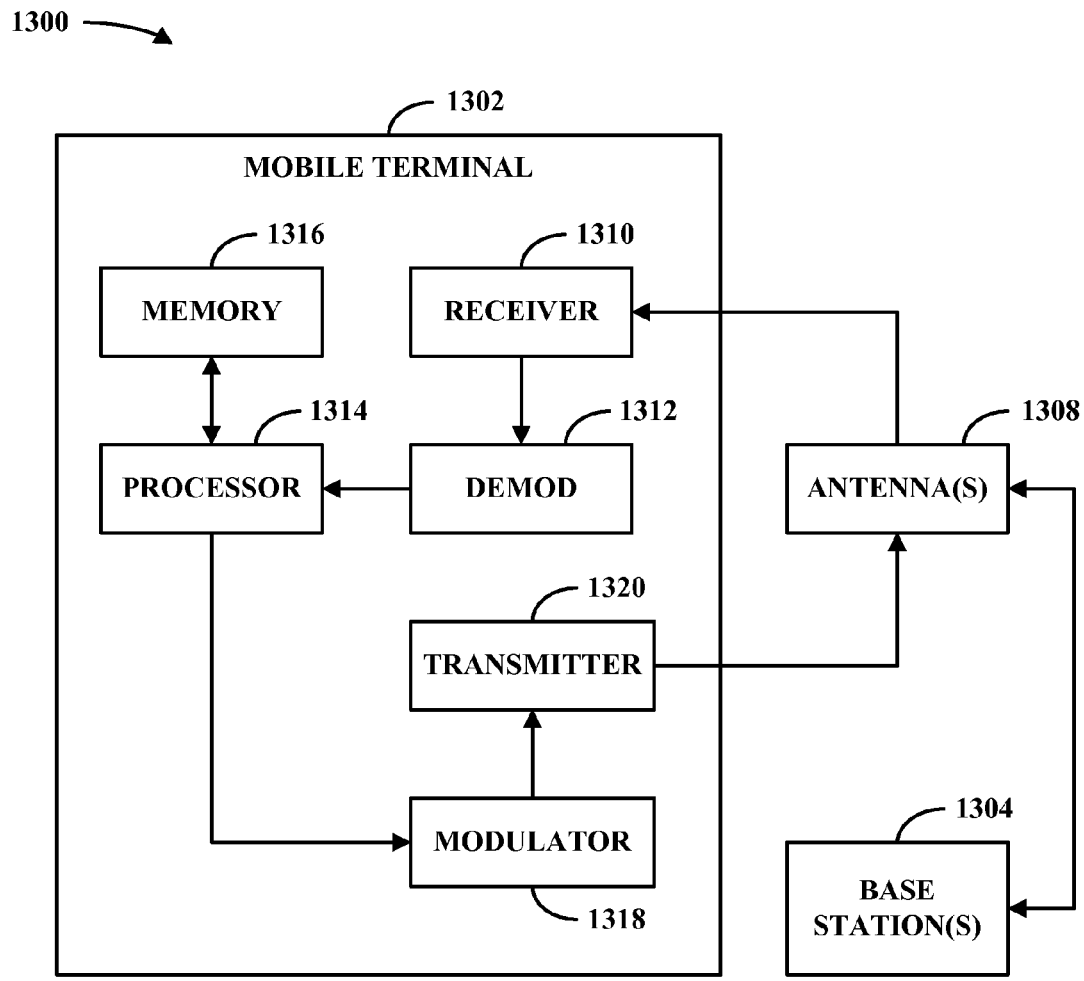

FIG. 13 is a block diagram of another system 1300 that can be utilized to implement various aspects of the functionality described herein. In one example, system 1300 includes a mobile terminal 1302. As illustrated, mobile terminal 1302 can receive signal(s) from one or more base stations 1304 and transmit to the one or more base stations 1304 via one or more antennas 1308. Additionally, mobile terminal 1302 can comprise a receiver 1310 that receives information from antenna(s) 1308. In one example, receiver 1310 can be operatively associated with a demodulator (Demod) 1312 that demodulates received information. Demodulated symbols can then be analyzed by a processor 1314. Processor 1314 can be coupled to memory 1316, which can store data and/or program codes related to mobile terminal 1302. Additionally, mobile terminal 1302 can employ processor 1314 to perform methodologies 600, 700, and/or other similar and appropriate methodologies. Mobile terminal 1302 can also employ one or more components described in previous figures to effectuate the described functionality; in one example, the components can be implemented by the processor 1314. Mobile terminal 1302 can also include a modulator 1318 that can multiplex a signal for transmission by a transmitter 1320 through antenna(s) 1308.

Figure 14:
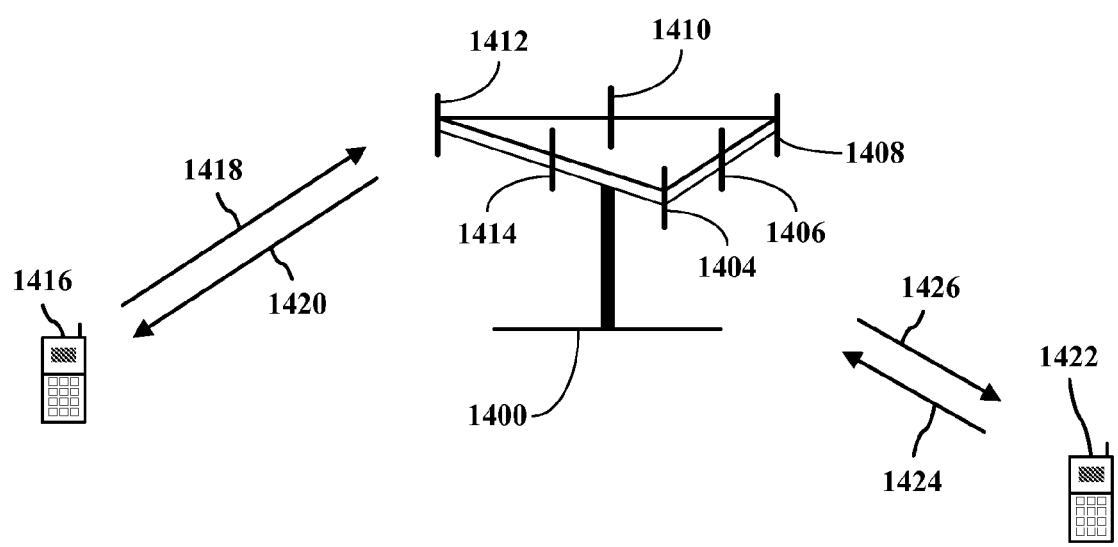
FIG. 14 illustrates an example wireless multiple-access communication system in accordance with various aspects set forth herein.

Referring now to FIG. 14, an illustration of a wireless multiple-access communication system is provided in accordance with various aspects. In one example, an access point 1400 (AP) includes multiple antenna groups. As illustrated in FIG. 14, one antenna group can include antennas 1404 and 1406, another can include antennas 1408 and 1410, and another can include antennas 1412 and 1414. While only two antennas are shown in FIG. 14 for each antenna group, it should be appreciated that more or fewer antennas may be utilized for each antenna group. In another example, an access terminal 1416 can be in communication with antennas 1412 and 1414, where antennas 1412 and 1414 transmit information to access terminal 1416 over forward link 1420 and receive information from access terminal 1416 over reverse link 1418. Additionally and/or alternatively, access terminal 1422 can be in communication with antennas 1406 and 1408, where antennas 1406 and 1408 transmit information to access terminal 1422 over forward link 1426 and receive information from access terminal 1422 over reverse link 1424. In a frequency division duplex system, communication links 1418, 1420, 1424 and 1426 can use different frequency for communication. For example, forward link 1420 may use a different frequency then that used by reverse link 1418.

Each group of antennas and/or the area in which they are designed to communicate can be referred to as a sector of the access point. In accordance with one aspect, antenna groups can be designed to communicate to access terminals in a sector of areas covered by access point 1400. In communication over forward links 1420 and 1426, the transmitting antennas of access point 1400 can utilize beamforming in order to improve the signal-to-noise ratio of forward links for the different access terminals 1416 and 1422. Also, an access point using beamforming to transmit to access terminals scattered randomly through its coverage causes less interference to access terminals in neighboring cells than an access point transmitting through a single antenna to all its access terminals.

An access point, e.g., access point 1400, can be a fixed station used for communicating with terminals and can also be referred to as a base station, an eNB, an access network, and/or other suitable terminology. In addition, an access terminal, e.g., an access terminal 1416 or 1422, can also be referred to as a mobile terminal, user equipment, a wireless communication device, a terminal, a wireless terminal, and/or other appropriate terminology.

Figure 15:
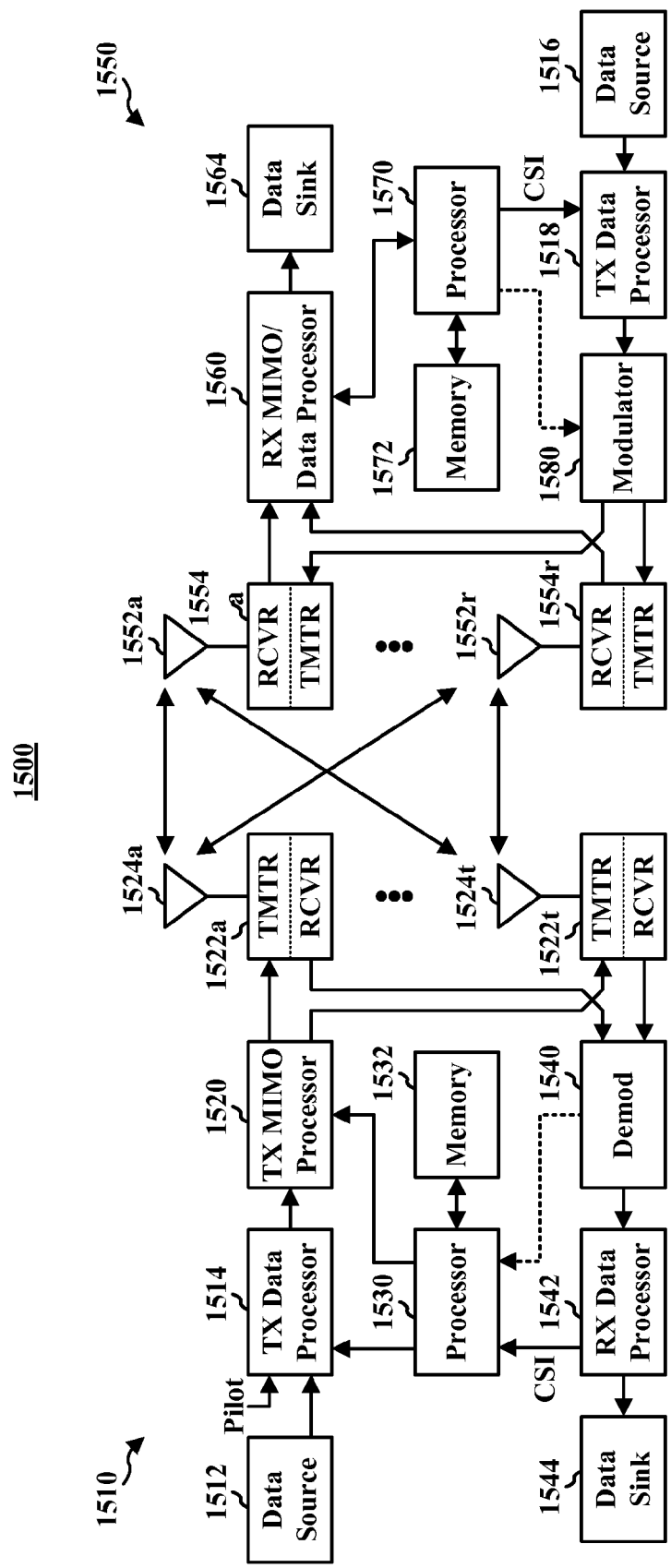
FIG. 15 is a block diagram illustrating an example wireless communication system in which various aspects described herein can function.

Referring now to FIG. 15, a block diagram illustrating an example wireless communication system 1500 in which various aspects described herein can function is provided. In one example, system 1500 is a multiple-input multiple-output (MIMO) system that includes a transmitter system 1510 and a receiver system 1550. It should be appreciated, however, that transmitter system 1510 and/or receiver system 1550 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 1510 and/or receiver system 1550 described herein could be utilized in connection with a single output to single input antenna system.

In accordance with one aspect, traffic data for a number of data streams are provided at transmitter system 1510 from a data source 1512 to a transmit (TX) data processor 1514. In one example, each data stream can then be transmitted via a respective transmit antenna 1524. Additionally, TX data processor 1514 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 1550 to estimate channel response. Back at transmitter system 1510, the multiplexed pilot and coded data for each data stream can be modulated (i.e., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 1530.

Next, modulation symbols for all data streams can be provided to a TX processor 1520, which can further process the modulation symbols (e.g., for OFDM). TX MIMO processor 1520 can then provides $N_T$ modulation symbol streams to $N_T$ transceivers 1522a through 1522t. In one example, each transceiver 1522 can receive and process a respective symbol stream to provide one or more analog signals. Each transceiver 1522 can then further condition (e.g., amplify, filter, and upconvert) the analog signals to provide a modulated signal suitable for transmission over a MIMO channel. Accordingly, $N_T$ modulated signals from transceivers 1522a through 1522t can then be transmitted from $N_T$ antennas 1524a through 1524t, respectively.

In accordance with another aspect, the transmitted modulated signals can be received at receiver system 1550 by $N_R$ antennas 1552a through 1552r. The received signal from each antenna 1552 can then be provided to respective transceivers 1554. In one example, each transceiver 1554 can condition (e.g., filter, amplify, and downconvert) a respective received signal, digitize the conditioned signal to provide samples, and then processes the samples to provide a corresponding "received" symbol stream. An RX MIMO/data processor 1560 can then receive and process the $N_R$ received symbol streams from $N_R$ transceivers 1554 based on a particular receiver processing technique to provide $N_T$ "detected" symbol streams. In one example, each detected symbol stream can include symbols that are estimates of the modulation symbols transmitted for the corresponding data stream. RX processor 1560 can then process each symbol stream at least in part by demodulating, deinterleaving, and decoding each detected symbol stream to recover traffic data for a corresponding data stream. Thus, the processing by RX processor 1560 can be complementary to that performed by TX MIMO processor 1520 and TX data processor 1516 at transmitter system 1510. RX processor 1560 can additionally provide processed symbol streams to a data sink 1564.

In accordance with one aspect, the channel response estimate generated by RX processor 1560 can be used to perform space/time processing at the receiver, adjust power levels, change modulation rates or schemes, and/or other appropriate actions. Additionally, RX processor 1560 can further estimate channel characteristics such as, for example, signal-to-noise-and-interference ratios (SNRs) of the detected symbol streams. RX processor 1560 can then provide estimated channel characteristics to a processor 1570. In one example, RX processor 1560 and/or processor 1570 can further derive an estimate of the "operating" SNR for the system. Processor 1570 can then provide channel state information (CSI), which can comprise information regarding the communication link and/or the received data stream. This information can include, for example, the operating SNR. The CSI can then be processed by a TX data processor 1518, modulated by a modulator 1580, conditioned by transceivers 1554a through 1554r, and transmitted back to transmitter system 1510. In addition, a data source 1516 at receiver system 1550 can provide additional data to be processed by TX data processor 1518.

Back at transmitter system 1510, the modulated signals from receiver system 1550 can then be received by antennas 1524, conditioned by transceivers 1522, demodulated by a demodulator 1540, and processed by a RX data processor 1542 to recover the CSI reported by receiver system 1550. In one example, the reported CSI can then be provided to processor 1530 and used to determine data rates as well as coding and modulation schemes to be used for one or more data streams. The determined coding and modulation schemes can then be provided to transceivers 1522 for quantization and/or use in later transmissions to receiver system 1550. Additionally and/or alternatively, the reported CSI can be used by processor 1530 to generate various controls for TX data processor 1514 and TX MIMO processor 1520. In another example, CSI and/or other information processed by RX data processor 1542 can be provided to a data sink 1544.

In one example, processor 1530 at transmitter system 1510 and processor 1570 at receiver system 1550 direct operation at their respective systems. Additionally, memory 1532 at transmitter system 1510 and memory 1572 at receiver system 1550 can provide storage for program codes and data used by processors 1530 and 1570, respectively. Further, at receiver system 1550, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method of a mobile management entity (MME) for establishing multiple radio bearers in wireless communications, comprising:
   receiving a request to create one or more radio bearers;
   determining which of the one or more radio bearers to request;
   creating separate non-access stratum (NAS) messages, based on that determination, for establishing the one or more radio bearers and including the separate NAS messages in a list of bearers; and
   transmitting the list of bearers and associated NAS messages to a base station for initialization of at least one of the one or more radio bearers.

2. The method of claim 1, wherein each NAS message is comprised within an individual NAS packet data unit (PDU).

3. The method of claim 2 wherein the NAS PDU is linked to a given entry in the list of bearers.

4. An apparatus that is a mobile management entity that facilitates establishing multiple radio bearers in wireless communications, comprising:
   means for receiving a request to create one or more radio bearers;
   means for determining which of the one or more radio bearers to request,
   means for creating separate non-access stratum (NAS) messages, based on that determination, for establishing the one or more radio bearers and including the separate NAS messages in a list of bearers; and
   means for transmitting the list of bearers and associated NAS messages to a base station for initialization of the one or more radio bearers.

5. The apparatus of claim 4, wherein each NAS message is comprised within an individual NAS packet data unit (PDU).

6. The apparatus of claim 5, wherein the NAS PDU is linked to a given entry in the list of bearers.

7. A wireless communications apparatus that is a mobile management entity (MME) for establishing multiple radio bearers in wireless communications, comprising:
   a memory; and
   at least one processor coupled to the memory and configured to:
   receive a request to create one or more radio bearers;
   determine which of the one or more radio bearers to request;
   create separate non-access stratum (NAS) messages, based on that determining, for establishing the one or more radio bearers and including the separate NAS messages in a list of bearers; and
   transmit the list of bearers and associated NAS messages to a base station for initialization of at least one of the one or more radio bearers.

8. The apparatus of claim 7, wherein each NAS message is comprised within an individual NAS packet data unit (PDU).

9. The apparatus of claim 8, wherein the NAS PDU is linked to a given entry in the list of bearers.

10. A non-transitory computer-readable medium storing computer executable code for wireless communication, comprising code for:
    establishing, at a mobile management entity (MME), multiple radio bearers in wireless communications;
    receiving, at the MME, a request to create one or more radio bearers;
    determining, at the MME, which of the one or more radio bearers to request
    creating, at the MME, separate non-access stratum (NAS) messages, based on that determination, for establishing the one or more radio bearers and including the separate NAS messages in a list of bearers; and
    transmitting, from the MME, the list of bearers and associated NAS messages to a base station for initialization of at least one of the one or more bearers.

11. The non-transitory computer-readable medium of claim 10, wherein each NAS message is comprised within an individual NAS packet data unit (PDU).

12. The non-transitory computer-readable medium of claim 11, wherein the NAS PDU is linked to a given entry in the list of bearers.

13. A method of a base station for establishing multiple radio bearers in wireless communications, comprising:
    receiving a list of one or more radio bearers, bearer set up requests, and non-access stratum (NAS) messages from a network component, wherein each bearer has an associated NAS message;
    attempting to set up each bearer according to the bearer request and forwarding the associated NAS messages to a mobile device;
    determining if a bearer is unable to be initialized; and
    transmitting a failure message to the network component when the bearer is unable to be initialized.

14. The method of claim 13, wherein the base station forwards the associated NAS message when a bearer is initialized.

15. The method of claim 14, wherein the base station transmits a bearer success message to the network component for each bearer that is initialized.

16. An apparatus that is a base station for establishing multiple radio bearers in wireless communications, comprising:
    means for receiving a list of one or more radio bearers, bearer set up requests, and non-access stratum (NAS) messages from a network component, wherein each bearer has an associated NAS message;
    means for attempting to set up each bearer according to the bearer request and forwarding the associated NAS messages to a mobile device;

means for determining if a bearer is unable to be initialized; and means for transmitting a failure message to the network component when the bearer is unable to be initialized.

17. The apparatus of claim 16, wherein the base station forwards the associated NAS message when a bearer is initialized.

18. The apparatus of claim 17, wherein the base station transmits a bearer success message to the network component for each bearer that is initialized.

19. A wireless communications apparatus that is a base station for establishing multiple radio bearers in wireless communications, comprising:
   a memory; and
   at least one processor coupled to the memory and configured to:
   receive a list of one or more radio bearers, bearer set up requests, and non-access stratum (NAS) messages from a network component, wherein each bearer has an associated NAS message;
   attempt to set up each bearer according to the bearer request and forwarding the associated NAS messages to a mobile device;
   determine if a bearer is unable to be initialized; and
   transmit a failure message to the network component when the bearer is unable to be initialized.

20. The apparatus of claim 19, wherein the base station forwards the associated NAS message when a bearer is initialized.

21. The apparatus of claim 20, wherein the base station transmits a bearer success message to the network component for each bearer that is initialized.

22. A non-transitory computer-readable medium storing computer executable code for wireless communication, comprising code for:
   establishing multiple radio bearers in wireless communications;
   receive a list of one or more radio bearers, bearer set up requests, and non-access stratum (NAS) messages from a network component, wherein each bearer has an associated NAS message;
   code for causing the at least one computer to attempt to set up each bearer according to the bearer request and forwarding the associated NAS messages to a mobile device;
   coder for causing the at least one computer to determine if a bearer is unable to be initialized; and
   code for causing the at least one computer to transmit a failure message to the network component when a bearer is unable to be initialized.

23. The non-transitory computer-readable medium of claim 22, wherein the base station forwards the associated NAS message when a bearer is initialized.

24. The non-transitory computer-readable medium of claim 23, wherein the base station transmits a bearer success message to the network component for each bearer that is initialized.

* * * * *